United States Patent [19]
Seol

[11] Patent Number: 6,006,533
[45] Date of Patent: Dec. 28, 1999

[54] DRIVING CONTROL APPARATUS OF KIMCHI JAR AND METHOD THEREOF

[75] Inventor: Seung-Won Seol, Kwangju, Rep. of Korea

[73] Assignee: Kwangju Electronics Co., Ltd., Kwangju, Japan

[21] Appl. No.: 09/177,551

[22] Filed: Oct. 23, 1998

[30] Foreign Application Priority Data

Oct. 27, 1997 [KR] Rep. of Korea ............ 97-55440

[51] Int. Cl.⁶ .................................. F25B 1/00
[52] U.S. Cl. ............. 62/228.1; 99/468; 426/231
[58] Field of Search ................. 62/229, 228.1, 62/139, 140; 99/468; 426/231

[56] References Cited

U.S. PATENT DOCUMENTS

| | | | |
|---|---|---|---|
| 4,432,211 | 2/1984 | Oishi et al. | 62/155 |
| 4,916,912 | 4/1990 | Levine et al. | 62/80 |
| 4,932,217 | 6/1990 | Meyer | 62/156 |
| 4,974,418 | 12/1990 | Levine et al. | 62/82 |
| 5,421,247 | 6/1995 | Shim | 99/468 |
| 5,424,210 | 6/1995 | Bae et al. | 435/289 |
| 5,456,164 | 10/1995 | Bang | 99/468 |
| 5,476,672 | 12/1995 | Kim | 426/231 |
| 5,542,262 | 8/1996 | Park | 62/229 |
| 5,555,797 | 9/1996 | Chun | 99/468 |
| 5,752,568 | 5/1998 | Lee | 165/206 |

*Primary Examiner*—William Doerrler
*Assistant Examiner*—Marc Norman
*Attorney, Agent, or Firm*—Burns, Doane, Swecker & Mathis, L.L.P.

[57] ABSTRACT

A driving control apparatus of kimchi jar and method thereof, temperature value of temperature sensor and state-changed temperature of water are compared to correct an error against temperature detected value of the temperature sensor and to drive a compressor according to the corrected temperature detected value, thereby maintaining accurately the temperature in the chamber as the refrigerated storage temperature to optimally store kimchi in refrigeration even though there is generated an error at the temperature detected value due to an erroneous temperature sensor.

4 Claims, 4 Drawing Sheets

DRIVING CONTROL APPARATUS OF KIMCHI JAR AND METHOD THEREOF

BACKGROUND OF THE INVENTION

1. Field of the Invention

The present invention relates to a kimchi jar, and more particularly to a driving control apparatus of a kimchi jar and a method thereof by which temperature in the jar is accurately detected to drive a compressor and to optimally store the kimchi in refrigeration.

2. Description of the Prior Art

Generally, a refrigerator equipped with a refrigerating chamber and a freezing chamber is used to store frozen food, refrigerated food or kimchi in respectively appropriate temperatures. Meanwhile, when kimchi and refrigerated food are stored together in a refrigerating chamber of a refrigerator, odor generated from fermentation of the kimchi causes an interior of the refrigerating chamber to be filled with bad smell and leaves other refrigerated food to be permeated therewith, harming intrinsic smell of the refrigerated food, which necessitates kimchi to be stored in a separate jar.

Furthermore, although a kimchi jar containing kimchi should be buried underground for adequate fermentation and flavor thereof, it is very difficult in an environment where most people live in an apartment, row house or the like to bury the jar underground.

Researches and other studies on kimchi stored in a separate container such as kimchi jar are carried out vigorously, and a conventional kimchi jar is illustrated in FIG. 1.

As illustrated in FIG. 1, the conventional kimchi jar includes a body 10, a door 20, a manipulating unit 30 equipped with a plurality of keys for establishment of various functions and execution thereof and a chamber 40 for storing the kimchi.

Now, operation of the driving control method of a kimchi jar thus constructed will be described with reference to FIG. 1.

First of all, when kimchi is stored in the chamber 40 of the body 10 and a refrigerated storage after fermentation is selected through the manipulating unit 30, a fermentation temperature (preferably 25 degrees celsius) set up in the chamber 40 for established fermentation period is maintained to ferment the kimchi.

Next, a compressor motor is driven to circulate refrigerant, and air in the chamber 40 is heat-exchanged and cooled by an evaporator disposed in the body 10, such that an interior temperature in the chamber 40 maintains an established refrigerated storage temperature (preferably, approximately zero degree celsius) to thereby store the kimchi in refrigerated fermented state.

Meanwhile, FIG. 2 illustrates a state change of water, where it can be noted that temperature does not change during a predetermined period of time (T) from water-freezing zero degree celsius to a time of state-change of the water.

However, there is a problem in that kimchi cannot be properly fermented or stored in refrigeration because a temperature sensor installed in the chamber is fixedly established at a low temperature state and as time goes by an error is generated on the temperature detected through the temperature sensor, resulting in inaccuracy in detection of the inner temperature in the chamber.

By way of example, when an actual temperature of zero degree celsius is detected as below zero degree celsius (Ts0° C.) due to malfunction of the temperature sensor, as illustrated in FIG. 3, the overall inner temperature of the chamber detected by the temperature sensor is lowly sensed due to a temperature difference (▲T1), thereby causing an improper fermentation and refrigerated storage of the kimchi.

Furthermore, when the temperature of zero degree celsius (Ts0° C.) is detected higher than actual zero degree celsius due to malfunction of the temperature sensor, as illustrated in FIG. 4, the overall inner temperature of the chamber detected by the temperature sensor is highly sensed due to a temperature difference (▲T2), again causing an improper fermentation and refrigerated storage of the kimchi.

SUMMARY OF THE INVENTION

The present invention is disclosed to solve the aforementioned problems and it is an object of the present invention to provide a driving control apparatus of kimchi jar and method thereof by which a temperature detected in the course of state change of water is utilized to accurately detect a temperature in the chamber and to drive a compressor in response thereto, thereby optimally storing kimchi in refrigeration.

In accordance with one object of the present invention, there is provided a driving control apparatus of a kimchi jar, the apparatus comprising:

a temperature detecting unit for detecting temperature changes of water which very according to temperatures in a chamber;

a control unit for detecting internal temperatures in the chamber according to temperature changes of the water detected by the temperature detecting unit and for generating a control signal for driving a compressor in response thereto; and a compressor driving unit for driving the compressor according to the control signal of the control unit.

In accordance with another object of the present invention, there is provided a driving control method of a kimchi jar, the method comprising the steps of:

driving a compressor according to detected value of temperature at a temperature sensor for detecting temperatures of water which varies according to temperatures in a chamber;

comparing the detected value to temperature at the temperature sensor with state change of temperature of the water to thereby correct an error against the detected value of temperature at the temperature sensor; and driving the compressor according to detected value of temperature corrected at the temperature correcting step.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
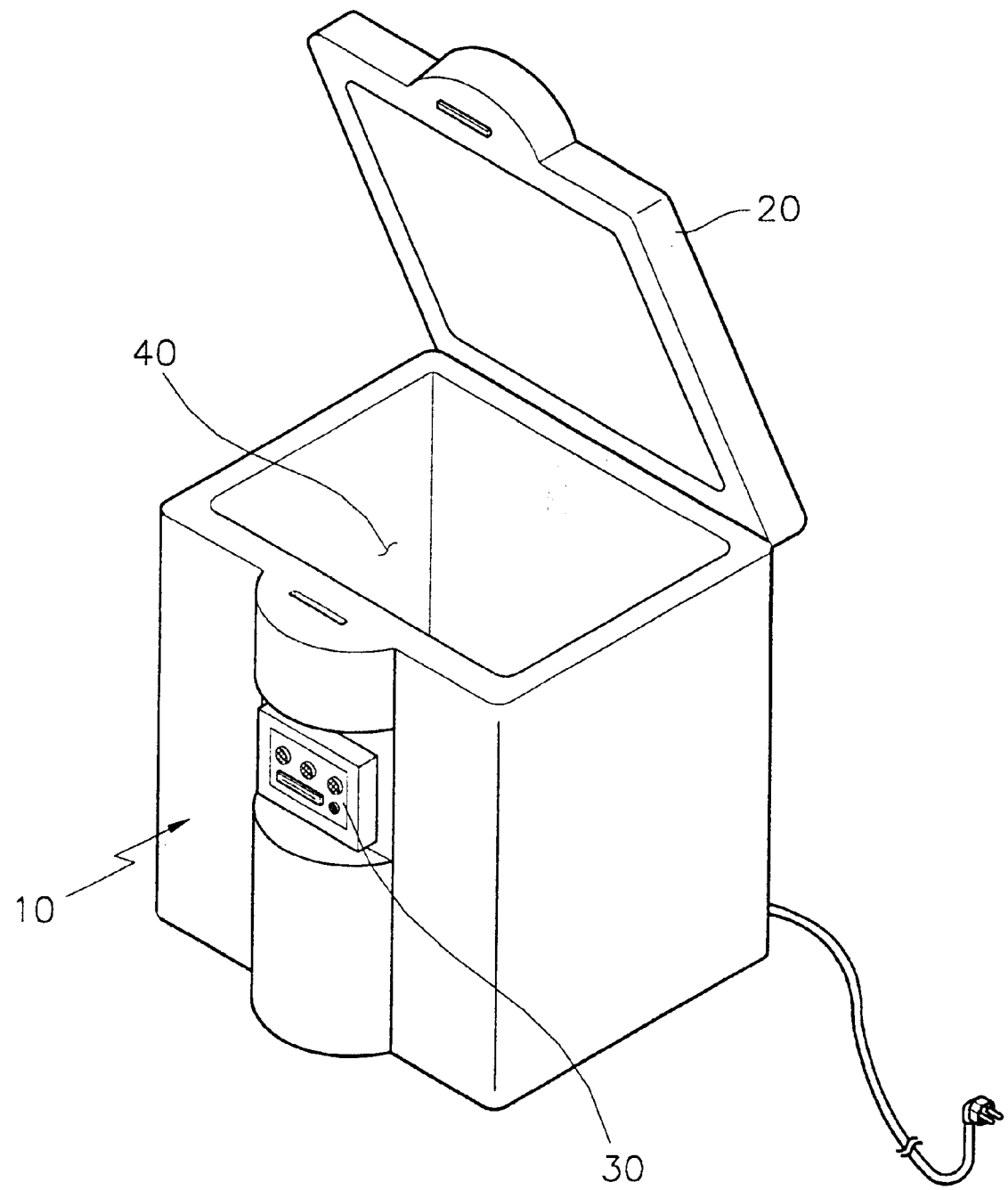
FIG. 1 is a perspective view for externally illustrating a conventional kimchi jar.
Figure 2:
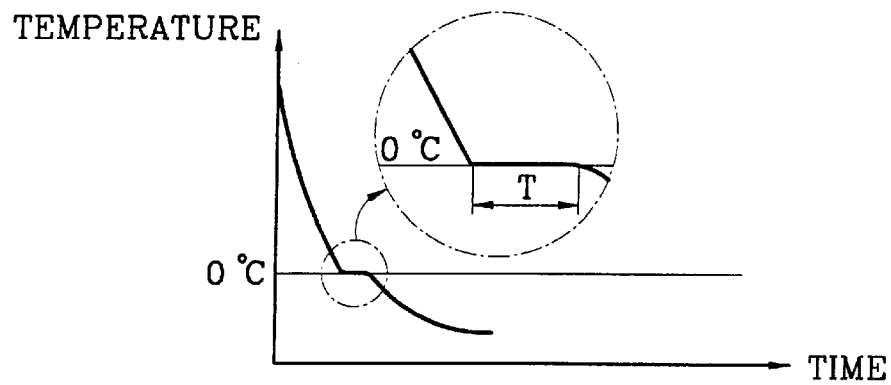
FIG. 2 is a schematic graph for illustrating a state change of water.
Figure 3:
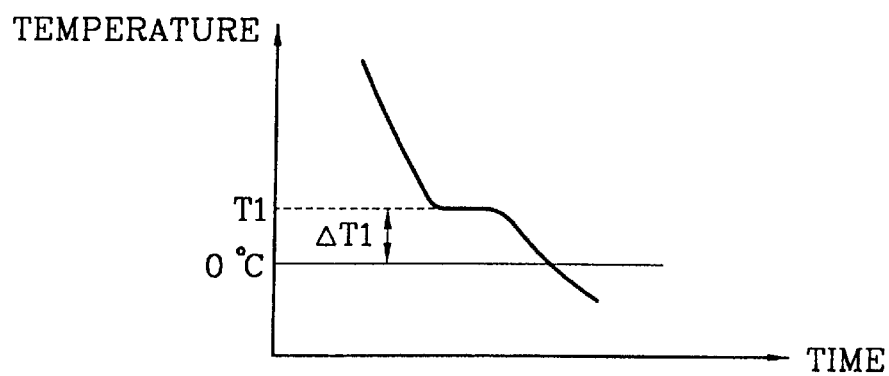
FIGS. 3 and 4 are schematic graphs for illustrating temperature difference generated when a temperature sensor is out of order.
Figure 4:
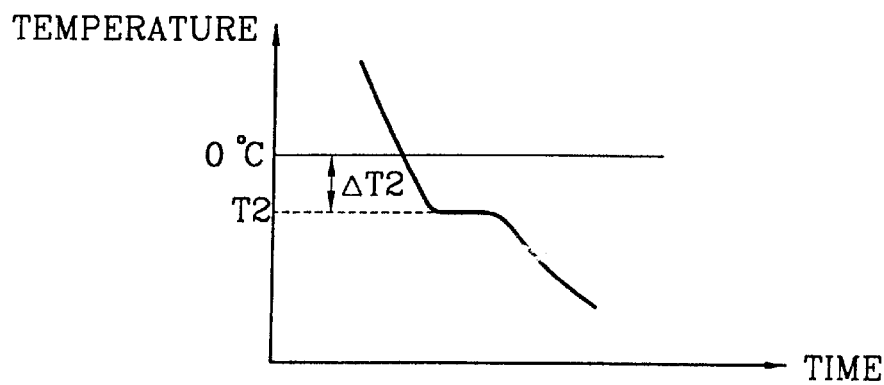

Now, preferred embodiment of the present invention will be described in detail with reference to the accompanying drawings. Throughout the drawings, like reference numerals and symbols are used for designation of like or equivalent parts or portions for simplicity of illustration and explanation, and redundant references will be omitted.

Figure 5:
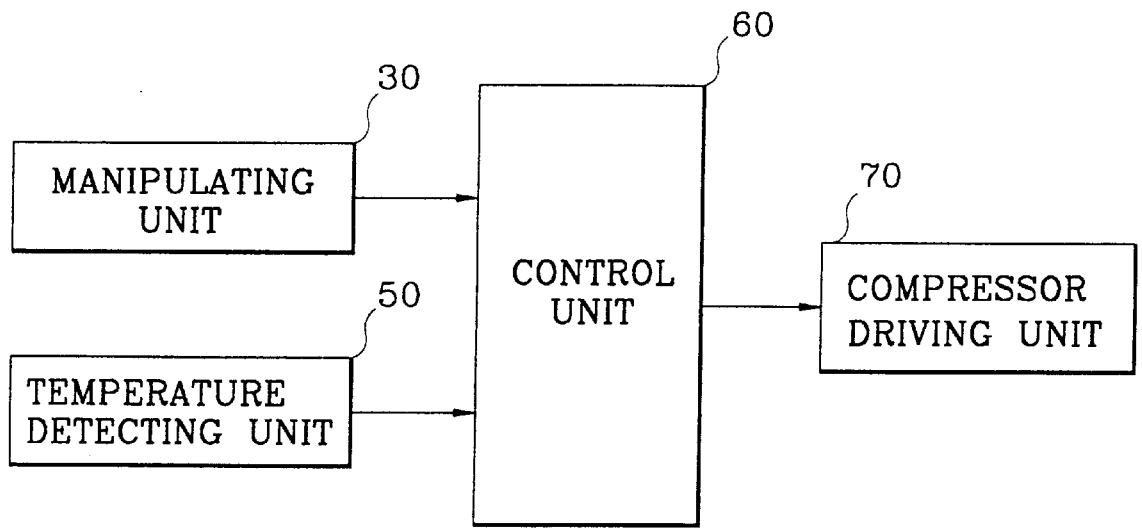
FIG. 5 is a schematic block diagram for illustrating a driving control apparatus of a kimchi jar according to an embodiment of the present invention.

FIG. 5 is a schematic block diagram for illustrating a driving control apparatus of a kimchi jar according to the embodiment of the present invention, wherein the apparatus includes a manipulating unit 30, a temperature detecting unit 50, a control unit 60 and a compressor driving unit 70.

Figure 6:
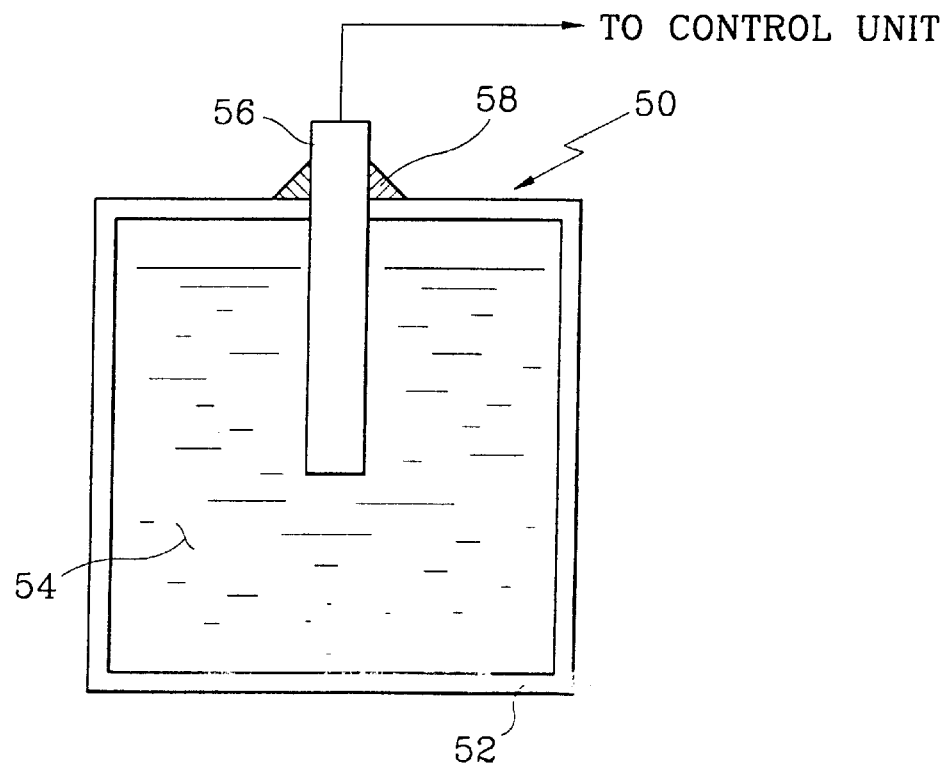
FIG. 6 is a detailed diagram of a temperature detecting unit in FIG. 5.

As illustrated in FIG. 6, the temperature detecting unit 50 is disposed with a case 52 in which a predetermined quantity of water is stored, a temperature sensor 56 for detecting temperature of water according to temperature changes in a chamber 40, and a packing member 58 for preventing leakage of water stored in the case 52.

The control unit 60 serves to generate a control signal for driving a compressor according to an operation mode selected by the manipulating unit 30, check the temperature detected by the temperature sensor 56 in the temperature detecting unit 50 to operate a temperature difference between a state-changed temperature (approximately zero degree celsius) of the water and a temperature detected by the temperature sensor 56 and then to compensate temperature detected by the temperature sensor 56 for generation of a control signal for driving a compressor according to the compensated temperature.

Furthermore, the compressor driving unit 70 serves to drive a compressor according to a control signal from the control unit 60 to thereby circulate refrigerant and to cool the chamber 40.

Figure 7:
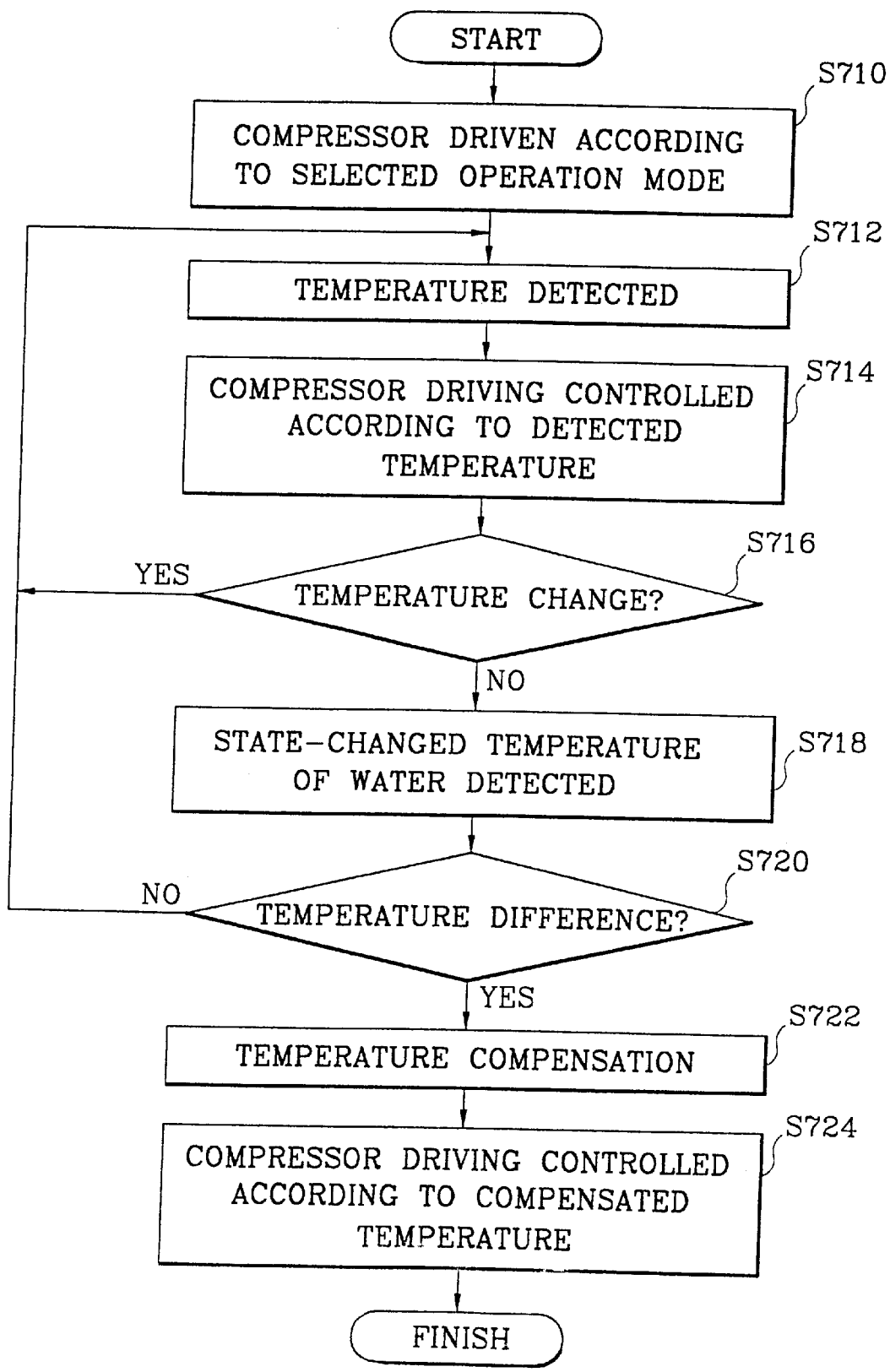
FIG. 7 is a flow chart for illustrating an operational process of a control unit illustrated in FIG. 5.

Now, operational process of the present invention thus constructed will be described with reference to FIGS. 5, 6 and 7, where S denotes steps.

First of all, when a user selects an operational mode of a kimchi jar by way of the manipulating unit 30 and manipulates an operation key, the control unit 60 generates a control signal for driving a compressor according to the operational mode selected by the manipulating mode 30. The compressor is driven by the control signal generated from the control unit 60 via the compressor driving unit 70 to circulate the refrigerant(step S710) and to cool the chamber 40.

When the chamber 40 is cooled, temperature of water 54 contained in the case 52 is changed, which is detected by the temperature sensor 56 to thereafter be provided to the control unit 60 (step S712).

Furthermore, the control unit 60 generates a control signal for driving a compressor according to the temperature of water 54 detected by the temperature sensor 56, and the compressor is driven by the control signal generated from the control unit 60 via the compressor driving unit 70. The kimchi jar is cooled according to the operational mode selected by the manipulating unit 30.

Meanwhile, the control unit 60 checks whether the temperature of the water 54 detected by the temperature sensor 56 has been changed(step S716) and if the temperature has been changed, flow returns to step S71 to repeatedly perform steps S712 and S714. It the temperature has not changed for a predetermined established time, the control unit 60 discriminates the temperature in the chamber 40 as state-changed temperature of the water 54 (approximately zero degree celsius)(step S718).

Next, the control unit 60 compares the state-changed temperature of water (approximately zero degree celsius) with the present temperature detected via the temperature sensor 56 to see if there is any difference in temperature, step S720, and if there is no difference in temperature, the control unit 60 discriminates the temperature detected via the temperature sensor 56 as the accurate temperature.

Successively, the control unit 60 generates a control signal for controlling drive of the compressor according to the inner temperature of the chamber detected via the temperature sensor 56, such that the kimchi jar is cooled according to the operation mode selected via the manipulating unit 30 because the compressor is driven by the control signal received via the compressor driving unit 70 from the control unit 60

Meanwhile, as a result of discrimination at step S720, if there is a temperature difference between the state-changed temperature of water (approximately zero degree celsius) and the present temperature detected by the temperature sensor 56, the control unit operates the temperature difference and compensates the temperature detected by the temperature sensor 56 by as much as the temperature difference, step S722.

Successively, the control unit 60 generates a control signal for controlling the drive of the compressor according to the compensated temperature, such that the kimchi jar is cooled according to the operation mode selected via the manipulating unit 30 because the

What is claimed is:

1. A kimchi jar forming a chamber for storing kimchi, the jar having a refrigeration mechanism for controlling a temperature of the chamber, the refrigeration mechanism including a compressor and a control system for controlling operation of the compressor based on a temperature in the chamber, the control system including:

a case containing a liquid whose temperature varies with the internal temperature of the chamber, the liquid having a known change-of-state temperature which remains constant during the change of state of the liquid;

a temperature sensor for sensing a temperature of the liquid in the case; and a control unit for controlling operation of the refrigeration mechanism in accordance with a temperature of the chamber, the control unit connected to the temperature sensor and to the compressor for detecting changes in temperature of the liquid and for determining that the liquid temperature equals the change-of-state temperature when the liquid temperature remains constant for a predetermined period during operation of the refrigeration mechanism, the control unit being operable to compare such state-of-change temperature with the current temperature sensed by the temperature sensor and to compensate for any difference therebetween.

2. The kimchi jar according to claim 1 wherein the liquid is water.

3. A method of controlling a refrigeration mechanism of a kimchi jar including a chamber for storing kimchi, a case containing liquid whose temperature varies with the internal temperature of the chamber, the liquid having a known change-of-state temperature which remains constant during the change of state of the liquid, the method comprising the steps of:

A) detecting changes in temperature of the liquid by a temperature sensor;

B) determining that the liquid temperature equals the change-of-state temperature when the temperature detected in step A remains unchanged for a predetermined period, and comparing the change-of-state temperature with a temperature currently sensed by the temperature sensor;

C) determining that an inaccuracy exists in the temperature sensor when there is detected a difference between the change-of-state temperature and with the currently sensed temperature in step B;

D) correcting the sensed temperature by the difference detected in step C; and

E) operating a compressor of the refrigeration mechanism in accordance with the corrected sensed temperature.

4. The method according to claim 3 wherein the liquid is water.

* * * * *